United States Patent
Huotari et al.

(10) Patent No.: US 8,260,257 B2
(45) Date of Patent: Sep. 4, 2012

(54) KEY DISTRIBUTION FOR WIRELESS DEVICES

(75) Inventors: Allen J. Huotari, Garden Grove, CA (US); Manrique Brenes, Corona Del Mar, CA (US)

(73) Assignee: Cisco Technology, Inc., San Jose, CA (US)

( * ) Notice: Subject to any disclaimer, the term of this patent is extended or adjusted under 35 U.S.C. 154(b) by 1393 days.

(21) Appl. No.: 11/052,174

(22) Filed: Feb. 7, 2005

(65) Prior Publication Data

US 2006/0178131 A1    Aug. 10, 2006

(51) Int. Cl.
*H04M 1/68* (2006.01)
(52) U.S. Cl. ............ 455/410; 455/403; 455/435.2; 455/456.6; 455/436; 455/411
(58) Field of Classification Search .......... 455/426, 455/412.1, 412.2, 410, 411, 450, 435.1–435.2, 455/403, 456.6; 713/156, 206; 709/206; 370/328, 338, 352, 348
See application file for complete search history.

(56) References Cited

U.S. PATENT DOCUMENTS

| | | | |
|---|---|---|---|
| 2002/0147008 A1* | 10/2002 | Kallio | 455/426 |
| 2005/0076198 A1* | 4/2005 | Skomra et al. | 713/156 |
| 2005/0125693 A1* | 6/2005 | Duplessis et al. | 713/201 |
| 2005/0144237 A1* | 6/2005 | Heredia et al. | 709/206 |
| 2005/0190747 A1* | 9/2005 | Sindhwani et al. | 370/352 |
| 2005/0226185 A1* | 10/2005 | Tell et al. | 370/331 |
| 2006/0045056 A1* | 3/2006 | O'Hara, Jr. | 370/338 |
| 2006/0116109 A1* | 6/2006 | Lortz et al. | 455/412.2 |
| 2006/0187871 A1* | 8/2006 | Jones | 370/328 |
| 2006/0209768 A1* | 9/2006 | Yan et al. | 370/338 |

* cited by examiner

*Primary Examiner* — Kiet Doan
*Assistant Examiner* — Michael T Vu
(74) *Attorney, Agent, or Firm* — Haynes and Boone, LLP

(57) ABSTRACT

A method for communicating a key to a wireless device includes communicating the key to a cellular telephone system which subsequently communicates the key to the wireless device. Thus, the need to manually enter a key into a wireless device to facilitate communication with a local area network is avoided.

12 Claims, 3 Drawing Sheets

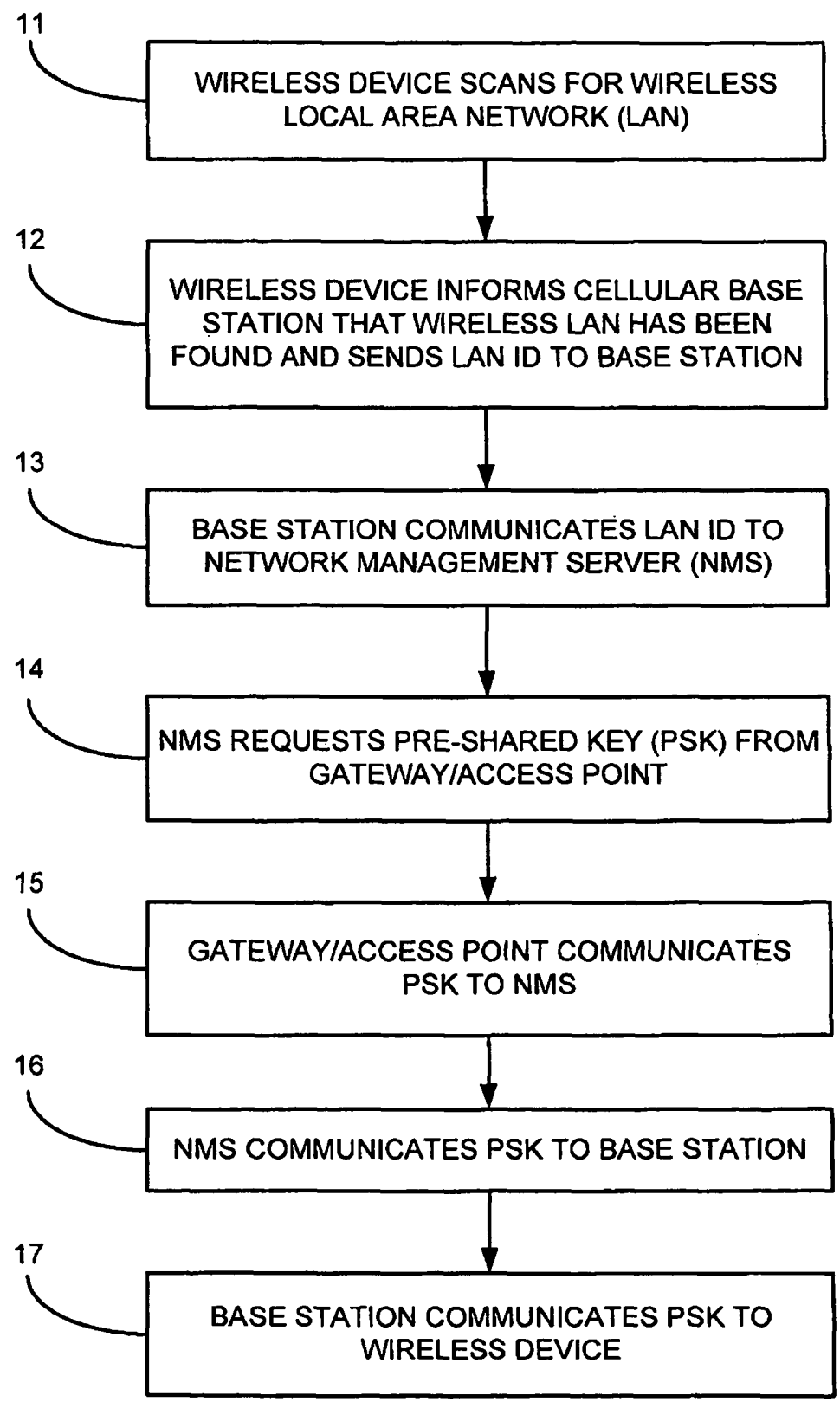

KEY DISTRIBUTION FOR WIRELESS DEVICES

TECHNICAL FIELD

The present invention relates generally to encryption for use in wireless communications. The present invention relates more particularly to key distribution for wireless local area network (LAN) devices.

BACKGROUND

Cellular telephones are well known. The pervasive use of cellular telephones has stimulated development into innovative new ways to increase the convenience and decrease the cost of their use. One example of such an innovation is the development of dual mode handsets. Dual mode handsets are cellular telephones that can be used both with a cellular telephone system and with a wireless local area network (LAN).

As voice over IP (VoIP) matures, there is a financial motivation to tie cellular telephones into wireless LANs. VoIP is substantially cheaper than traditional cellular communications. It is expected that dual mode handsets will have a substantial share of the cellular telephone market within a few years. Indeed, ABI Research has predicted that by 2009, there will be over 50 million dual mode handsets in operation, accounting for 7 percent of the handsets shipped that year.

Dual mode handsets allow a user to take advantage of residential gateways and access points to check email, surf the Internet, access enterprise networks, and place telephone calls. Thus, wireless LANs, such as WiFi compliant 802.11 networks, permit dual mode handset users to bypass the traditional cellular network by using the Internet to route telephone calls instead. This has the potential to result in substantial cost savings for both individuals and companies.

Access points are already common in homes, business offices, cafes, bookstores, and airports. As access points become more widespread, the advantages of such dual mode operation become even more apparent.

Cellular networks implement security procedures that provide adequately secure communications for normal personal and business use. These security procedures include airlink authentication and encryption, as well as subscriber authentication and service authorization.

When a handset is augmented to support IEEE 802.11, such security procedures must be implemented. However, since the airlink is then an IEEE 802.11 wireless LAN (that is, the airlink is then between the handset and an access point instead of between the handset and a cellular base station), a method for providing current wireless network security parameters (such as a pass phrase or key) to the handset is necessary.

IEEE 802.11 includes security features that are tested, validated, and certified under the WiFi Protected Access (WPA) program of the WiFi Alliance. There are two WPA security modes, WPA-Personal and WPA-Enterprise. The primary difference between these two modes is the use of an authentication server in the WPA-Enterprise mode, but not in the WPA-Personal mode. The authentication server participates in the exchange and distribution of keys. Thus, in the WPA-Enterprise mode, the distribution of keys is automatically facilitated.

However, in the WPA-Personal mode, all participating devices, e.g., cellular handsets, are expected to have a preshared key (PSK). PSKs are typically entered manually. Such manual entry may be acceptable for some devices, such as computers and devices that are readily connectable to computers, wherein the PSKs can be entered via a full size keyboard using a web browser. However, manual entry of PSKs is not a desired solution for devices that do not have and are not readily connectable to a full size keyboard. Manual entry via a keypad, such as the keypad of a cellular telephone, can be a difficult and frustrating task. Such entry is inconvenient and prone to error.

Further, some mobile/nomadic devices may not even have a keyboard or other means for entering a key. Of course, with such devices the manual entry of a key is not an option.

Many different types of devices other than cellular handsets may be used in a WiFi compliant IEEE 802.11 network. Such devices can include printers, cameras, and digital audio/video devices. Some of these devices have keyboards or keypads and some of these devices do not.

In-band (using the normal IEEE 802.11 communications) key distribution presents a substantial security risk, and therefore is not a viable option. Prior to the cellular device obtaining a PSK, such in-band communications are unencrypted. In-band key distribution presents a security risk because such unencrypted communications may easily be intercepted and misused. This possibility of intercept is the very reason that encryption and key distribution is desirable in the first place.

As such, although the prior art has recognized, to a limited extent, the problem of distributing PSKs to wireless devices, the proposed solutions have, to date, been ineffective in providing a satisfactory remedy. Therefore, it is desirable to provide a method for communicating a key to a wireless device so that manual entry of the key is not necessary.

BRIEF DESCRIPTION OF THE DRAWINGS

FIG. 3 shows a flow chart of a method for communicating a key to a wireless device according to an exemplary embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENTS

A method and system for communicating a key to a wireless device is disclosed. According to one aspect of the present invention, a key is communicated to a wireless device out of band with respect to wireless network communication. As used herein, out of band can refer to any type of communication other than communication used by a wireless local area network (LAN) over which the wireless device communicates. For example, in an WiFi compliant IEEE 802.11 wireless network, out of band refers to any type of communication other than IEEE 802.11 compliant communication and includes cellular telephone communication.

According to one aspect of the present invention, the wireless device comprises a dual mode device, such as a dual mode handset, that communicates both via a cellular network and via a wireless LAN, wherein the key is communicated to the wireless device via the cellular network. Thus, the present invention is suitable for use in networks that do not have an authentication server, such as WPA-Personal mode wireless networks.

The present invention is suitable for use in a variety of different types of cellular systems, including Global Service Mobile (GSM) cellular systems, Code Division Multiple Access (CDMA) cellular systems, and Time Division Multiple Access (TDMA) cellular systems. Indeed, the present invention is suitable for use in types of communication networks other than cellular networks, including satellite communication networks, as long as the network is capable of facilitating communication of a key to a wireless device.

Examples of wireless devices to which keys can be communicated according to the present invention include printers, cameras, digital audio/video devices, desktop computers, mobile computers (such as laptops, notebook computers, pocket computers, etc.), personal digital assistants (PDAs), and cellular handsets. The wireless device can comprise a WiFi Protected Access (WPA) device.

Figure 1:
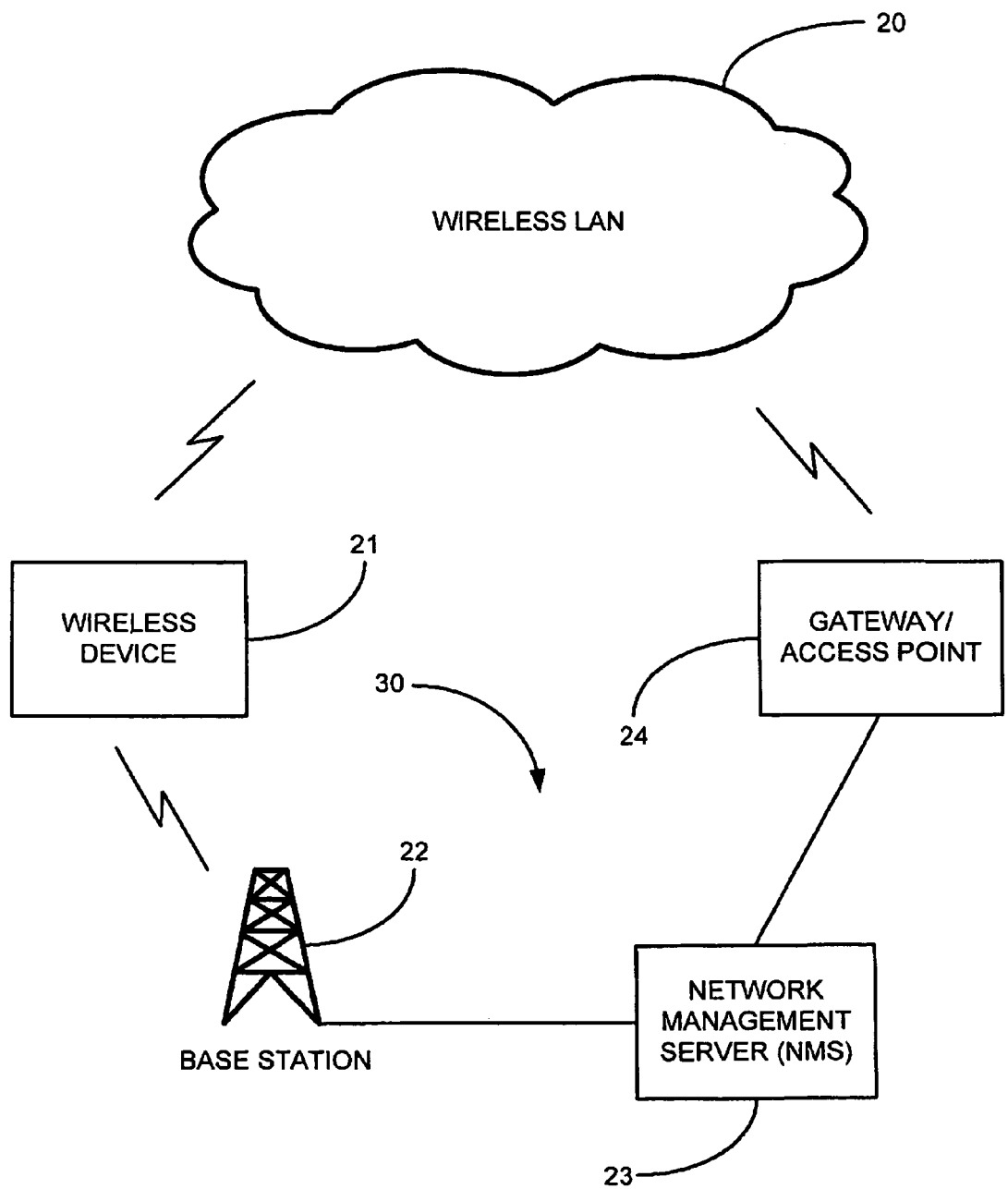
FIG. 1 is a block diagram showing communication between a wireless device, a wireless LAN, and a cellular telephone system, so as to facilitate the distribution of a key from the wireless LAN to the wireless device via the cellular telephone system according to an exemplary embodiment of the present invention.

FIG. 1 shows communication between a wireless device 21, a wireless network 20, and a cellular telephone system 30, so as to facilitate distribution of a key from wireless LAN 20 to wireless device 21 according to one exemplary embodiment of the present invention. Wireless LAN 20 can comprise a WiFi compliant IEEE 802.11 home or office network. The present invention facilitates the use of wireless devices (such as wireless device 21) without requiring that wireless network 20 comprise an authentication server.

Wireless network 20 is in wireless communication with wireless device 21. However, until wireless device 21 has a pre-shared key (PSK), such communication is substantially limited to recognition protocol handshaking. Thus, until wireless device 20 has the PSK, data communications, such as VoIP, between wireless device 21 and wireless LAN 20 are not facilitated.

Wireless device 21 is in wireless communication with cellular telephone system base station 22. Base station 22 is in communication, either wired or wireless, with cellular telephone system network management server (NMS) 23. Base station 22 is not necessarily directly connected to or in direct communication with NMS 23. Other base stations and/or other cellular telephone equipment and/or network infrastructure equipment may be between base station 22 and NMS 23.

NMS 23 is in communication, typically wired communication, with a gateway/access point 24 of wireless network 20. NMS 23 is not necessarily directly connected to or in direct communication with gateway/access point 24. Other cellular telephone equipment and/or network infrastructure equipment may be between NMS 23 and gateway/access point 24.

Gateway/access point 24 is in communication with various devices of wireless LAN 20. For example, gateway/access point 24 can be in wired communication with a plurality of desktop computers, can be in wireless communication with another plurality of desktop computers, can be in wireless communication with a plurality of mobile computers, and can be in wireless communication with a plurality of personal digital assistants (PDAs).

Gateway/access point can be in communication with wireless device 21. Such communication can be either direct or via one or more other devices of wireless LAN 20. Thus, when wireless device 21 communicates with wireless LAN 20, such communication can be via gateway/access point 24.

Figure 2:
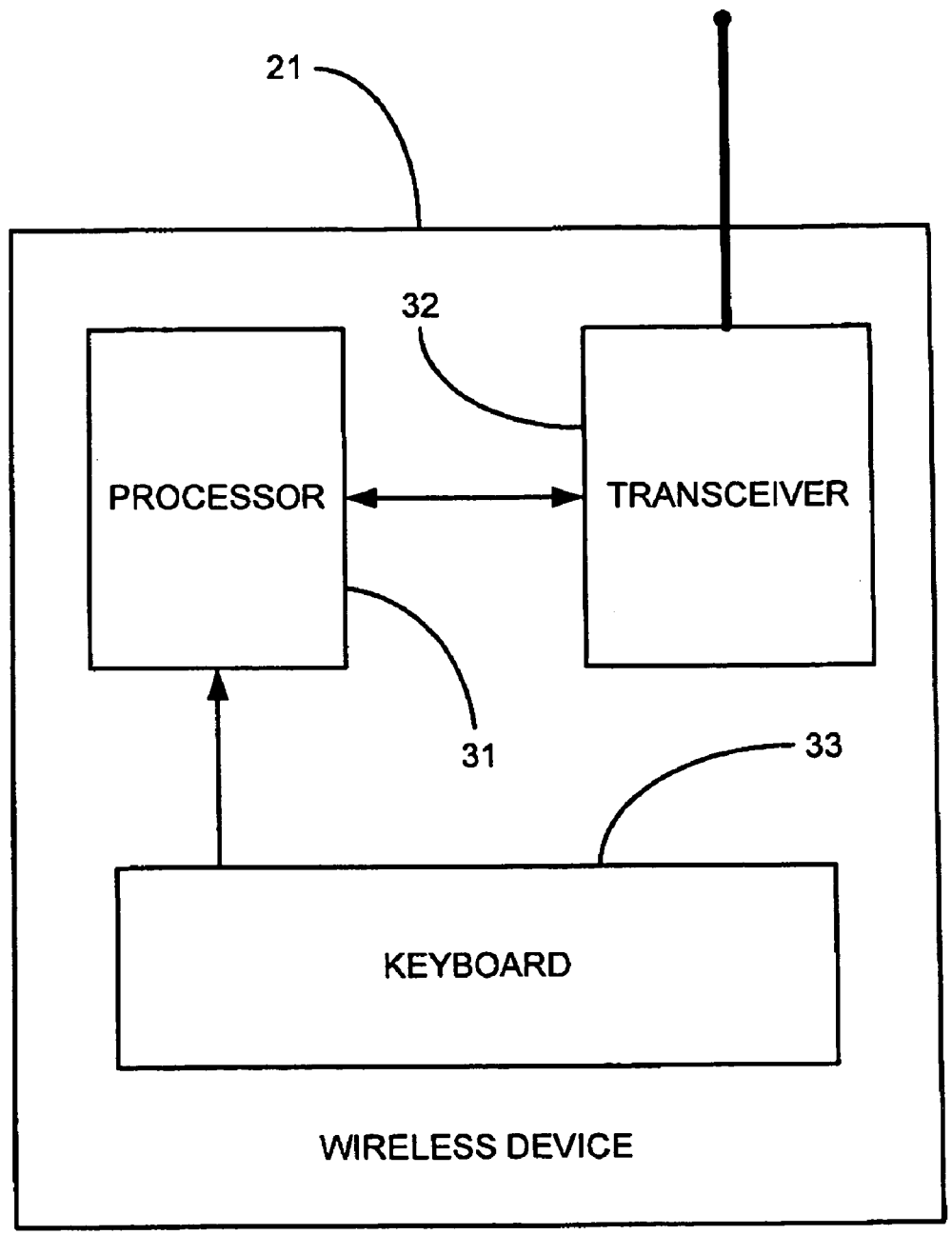
FIG. 2 is a block diagram showing an exemplary wireless device according to one aspect of the present invention.

FIG. 2 shows an exemplary wireless device 21 in further detail. As mentioned above, wireless device 21 can be a printer, camera, digital audio/video device, desktop computer, mobile computer (such as a laptop, notebook computer, pocket computer, etc.), personal digital assistant PDA, or cellular handset.

Wireless device 21 can comprise a processor 31 and a transceiver 32. Processor 31 is configured to cooperate with the transceiver 32 to scan for a wireless local area network (LAN) 20 and to send a LAN ID that uniquely identifies wireless network 20 to cellular telephone system 30. Transceiver 32 is configured to facilitate wireless communications, such as with wireless LAN 20 and/or cellular telephone system 30.

Wireless device 21 can comprise a keypad or keyboard 33. Keyboard 33 can facilitate the manual entry of a PSK. However, even if wireless device 21 comprises keyboard 33, such keyboards are often small and difficult to use, thus making them prone to error when attempting to manually enter a PSK. Even if keyboard 33 is a full size keyboard, the entry of a PSK is an inconvenient, at best.

FIG. 3 shows one exemplary embodiment of the method for distributing a key according to the present invention. According to this exemplary embodiment, a key is distributed to wireless device 21 via cellular telephone system 30, so as to avoid requiring a user to manually enter the key into wireless device 21. In this manner, communication between wireless device 21 and wireless LAN 20 is more easily facilitated and security is maintained.

More particularly, according to one aspect of the present invention wireless device 21 scans for a wireless LAN 20, as indicated in block 11. The scan can either be a passive scan or an active scan. In a passive scan, wireless device 21 discovers available wireless networks by receiving beacons that are transmitted by the wireless networks. In an active scan, wireless device 21 transmits an inquiry as to the presence of a particular network, such as to a wireless network having a known IEEE 802.11 service set identifier (SSID).

When wireless LAN 20 is found, wireless device 21 acquires a LAN ID therefrom and communicates the LAN ID, and optionally any other parameters that it has acquired from wireless LAN 20, to cellular base station 22, as indicated in block 12. Wireless device 21 can provide such information to cellular base station 22 via a cellular registration message or a modified cellular registration message transmitted to cellular base station 22. One example of a modified cellular registration message is a zone-based registration, wherein wireless device 21 registers when it enters a new zone, such as a new IEEE 802.11 wireless network. Another example of a modified cellular registration process is a parameter-change registration, wherein wireless device 21 registers when predetermined ones of its stored parameters change or when it enters a new IEEE 802.11 wireless network.

Cellular base station 22 communicates the LAN ID to NMS 23, as indicated in block 13. NMS 23 requests a pre-shared key (PSK) from gateway/access point 24, as indicated in block 14. NMS 23 can communicate with gateway/access point 24 via any desired method or protocol. For example, NMS 23 can communicate with gateway/access point 24 via cable modem (CableHome), digital subscriber link (DSL Forum TR-069), SNMP (802.11 MIB), or any other suitable means.

However, it can be important that communication between gateway/access point 24 and NMS 23 be secure, so that the PSK is not compromised. Generally, such communication is comparatively secure because it takes place completely within a cellular service provider's network or networks.

Gateway/access point 24 communicates the PSK to NMS 23, as shown in block 15. NMS 23 communicates the PSK to base station 22, as shown in block 16. Base station 22 communicates the PSK to wireless device 21, as shown in block 17. Once wireless device 21 has the PSK, then it is able to communicate data, such as VoIP, with wireless network 20 and consequently with a wide area network (WAN), such as the Internet, to which wireless network 20 is connected.

It is worthwhile to note that wireless device 21 need not associate to wireless LAN 20 at the time that wireless device 21 first finds wireless LAN 20 (before wireless device 21 obtains a PSK for wireless LAN 20). However, there can be some advantages to doing so. If the wireless device 21 associates to wireless LAN 20 before obtaining a PSK, wireless device 21 will be blocked from further communication with wireless LAN 20 by WiFi Protected Access (WPA).

One advantage to such earlier association is that it provides an opportunity for gateway/access point 24 to immediately notify cellular telephone system 30 that a non-authenticated device has associated to wireless LAN 20. Thus, gateway/access point 24 can then respond to such non-authenticated association by providing NMS 23 with information about itself and information that it has obtained from wireless device 21. For example, gateway/access point 24 can communicate a LAN ID and the wireless device's medium access controller (MAC) address to cellular telephone system 30. Cellular telephone system 30 can then compare the information regarding wireless device 21 provided by gateway/access point 24 to a database or the like to determine if wireless device 21 should be granted access to wireless LAN 20. Wireless device 21 may be authorized to have access to wireless LAN 20 because of a previous authorization process with wireless LAN 20 and/or cellular telephone system 30. If wireless device 21 should be granted access to wireless LAN 20, then cellular telephone system 30 can facilitate such access, such as by providing a PSK for wireless LAN 20 to wireless device 21.

NMS 23 can optionally query gateway/access point 24, such as periodically, so as to determine which, if any, previously registered wireless devices have associated to wireless LAN 20. In this manner, NMS 23 can track association of wireless devices 21 with wireless LAN 20 for billing, management, engineering maintenance, and other purposes. In this manner, NMS 23 can also provide PSKs to those registered wireless devices that have associated to wireless LAN 20, but have not yet received a PSK.

Communication between wireless device 21 and wireless LAN 20 can comprise a voice telephone call, such as a voice telephone call using VoIP. As those skilled in the art will appreciate, the use of VoIP can result in substantial cost savings when compared to traditional cellular communications. Communication between wireless device 21 and wireless LAN 20 can also comprise other types of data, including text, video and control signals.

Although the present invention is described as using an IEEE 802.11 compliant wireless network, those skilled in the art will appreciate that other types of wireless networks may similarly be used. For example, the wireless network may alternatively be a Bluetooth, Zigbee, or other type of wireless network. Thus, description of the present invention as being an IEEE 802.11 network is by way of example only, and not by way of limitation.

Further, although the present invention is described as using a local area network (LAN), the present invention can similarly be implemented using a wide area network (WAN). Therefore, the term LAN as used herein can be broadly defined to include WANs, such as the Internet.

Although the present invention is described as being used with a wireless LAN, those skilled in the art will appreciate that the LAN can have wired aspects as well. Thus, the LAN can be either totally wireless or any combination of wireless and wired.

According to at least some embodiments of the present invention, an improved method for distributing keys is provided because PSKs are not provided to unauthenticated devices and because PSKs are provided to authorized devices via secure out of band, e.g., cellular, communications.

A wireless device, such as a cellular telephone, can be authenticated even when it is idle. Only legitimate, authorized wireless devices can obtain PSKs for wireless networks, such as WiFi compliant IEEE 802.11 networks. PSKs are provided to authenticated wireless devices via secure (authenticated and encrypted), non-IEEE 802.11 communications. Thus, the security afforded by one or more aspects of the present invention is generally equivalent to that associated with manual entry of the PSK. However, manual entry is desirably avoided.

The method of the present invention can be practiced prior to the wireless device obtaining an Internet Protocol (IP) address. This is generally necessary because an IP address is typically only obtained by a wireless device after secure communication has been established, e.g., after the wireless device has received the PSK.

The wireless LAN's beacon can, if desired, be modified to provide additional information that the wireless device can then pass on to the cellular telephone system. For example, the beacon can advertise additional capabilities of the wireless network or geographic location information.

Practice of the present invention can generally be performed without modification to a standard IEEE 802.11 wireless network. However, such a network can be modified, if desired, to provide enhanced capabilities. Practice of the present invention does not require any particular cellular telephone network topology.

The present invention, according to at least some aspects thereof, provides a method for distributing keys to wireless devices such as printers, cameras, digital audio/video devices, desktop computers, mobile computers (such as laptops, notebook computers, pocket computers, etc.) and cellular handsets. Distribution of keys to such devices avoids undesirable manual entry of the keys thereinto and eliminates errors associated with such manual entry. It also eliminates the security risks associated with in-band (via an IEEE 802.11 compliant network) distribution of keys.

Embodiments described above illustrate, but do not limit, the invention. It should also be understood that numerous modifications and variations are possible in accordance with the principles of the present invention. Accordingly, the scope of the invention is defined only by the following claims.

What is claimed is:

1. A method for communicating a key for communicating on a wireless local area network to a wireless device, the method comprising communicating the key to the wireless device via a communication network, other than the wireless local area network, wherein communicating the key to the wireless device comprises:

the wireless device informing a cellular base station that the wireless local area network has been found;

the cellular base station communicating with a network management server;

the network management server communicating with a residential gateway/access point to request a key;

the residential gateway/access point communicating the key to the network management server;

the network management server communicating the key to the cellular base station; and the cellular base station communicating the key to the wireless device, wherein the wireless device comprises a dual mode device that is configured to communicate via both a cellular telephone system and a wireless local area network.

2. The method as recited in claim 1, wherein the key is communicated to the wireless device via a cellular telephone system.

3. The method as recited in claim 1, wherein the wireless device is configured to communicate with a computer network.

4. The method as recited in claim 1, wherein the wireless device comprises a WiFi Protected Access device operating in a WPA-Personal mode without the use of an authentication server.

5. The method as recited in claim 1, wherein the wireless device associates to the wireless local area network prior to receiving the key and a gateway/access point of the wireless kcal area network communicates information received from the wireless device to a network management server of a cellular telephone system to facilitate distribution of the key to the wireless device.

6. The method as recited in claim 1, wherein the device is configured to scan for an available IEEE 802.11 network and to preferentially use an IEEE 802.11 network.

7. A method for communicating using a dual-mode wireless device, the method comprising:

communicating a key to the wireless device from a first mode method of wireless communication other than cellular via a second mode method of wireless communication, different from the first mode method of wireless communication; and subsequently communicating via a local area network access point using the first mode method of wireless communication, wherein communicating the key to the wireless device comprises:

the wireless device informing a cellular base station that the wireless local area network has been found;

the cellular base station communicating with a network management server;

the network management server communicating with a residential gateway/access point to request a key;

the residential gateway/access point communicating the key to the network management server;

the network management server communicating the key to the cellular base station; and the cellular base station communicating the key to the wireless device 2, wherein the wireless device comprises a dual mode device that is configured to communicate via both a cellular telephone system and the wireless local area network.

8. A method for communicating a key to a dual-mode wireless device, the method comprising:

the wireless device scanning for a wireless local area network;

the wireless device informing a cellular base station that a local area network has been found and identifying the local area network;

the cellular base station communicating with a network management server, the network management server communicating with a residential gateway/access point to request a key;

the residential gateway/access point communicating the key to the network management server;

the network management server communicating the key to the cellular base station;

the cellular base station communicating the key to the wireless device, and communicating identifying information relating to the dual-mode phone to the network management server (NMS), wherein the access point communicates the identifying information relating to the dual-mode phone to the network management server (NMS) and communicates the identifying information relating to the wireless network to the network.

9. A method of wireless communication using a dual-mode device, comprising:

finding a wireless network;

communicating identifying information relating to the wireless network to a cellular phone system network management server (NMS);

requesting a key from an access point of the wireless network, wherein the cellular phone system network management server (NMS) requests the key;

communicating the key to the dual-mode device via the cellular phone system network management server (NMS) and a cellular phone base station;

communicating data with the wireless network subsequent to receiving the key, wherein the dual-mode device communicates the data via the access point, and communicating identifying information relating to the dual-mode phone to the network management server (NMS), wherein the access point communicates the identifying information relating to the dual-mode phone to the network management server (NMS) and communicates the identifying information relating to the wireless network to the network.

10. The method according to claim 9, wherein the wireless network is a wireless local area network.

11. The method according to claim 9, wherein communicating identifying information relating to the wireless network comprises the dual-mode device communicating the identifying information via the cellular phone base station.

12. The method according to claim 7, wherein the first mode method of communication is a wireless local area network method of communication and the second mode method of communication is a cellular telephone method of communication.

* * * * *